US006546062B1

United States Patent
Du et al.

(10) Patent No.: US 6,546,062 B1
(45) Date of Patent: Apr. 8, 2003

(54) WIRELESS NETWORK

(75) Inventors: Yonggang Du, Aachen (DE); Christoph Herrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/337,847

(22) Filed: Jun. 21, 1999

(30) Foreign Application Priority Data

Jun. 25, 1998 (DE) ......................................... 198 28 226
Nov. 27, 1998 (DE) ......................................... 198 54 820

(51) Int. Cl.[7] ............................................. H04B 10/22
(52) U.S. Cl. ....................... 375/342; 375/343; 375/356; 455/515; 455/517; 370/328; 370/507; 370/522
(58) Field of Search ................................ 375/130, 356, 375/141–150, 152, 342, 343; 370/335, 342, 441, 507, 525, 328; 455/450, 517, 524, 561, 515

(56) References Cited

U.S. PATENT DOCUMENTS 6,091,757 A * 7/2000 Cudak et al. ............... 370/508
6,259,689 B1 * 7/2001 Wethington et al. ........ 370/342
6,389,056 B1 * 5/2002 Kanterakis et al. ......... 370/342

OTHER PUBLICATIONS

By ETSI SMG2, Meeting No. 24, Cork Ireland, Dec. 1–5, 1997, TDOC SMG2 359/97, Concept Group Alpha–Wideband Direct–Sequence CDMA (WCDMA), Evaluation Document (3.0), Part 1.

* cited by examiner

Primary Examiner—Amanda T. Le
(74) Attorney, Agent, or Firm—Gwenaelle Le Pennec

(57) ABSTRACT

The invention relates to a wireless network which includes at least one base station (1 to 3) and a plurality of associated terminals (4 to 14) for the exchange of useful data and control data. According to the invention, the base station (1 to 3) is arranged to transmit the starting instant of a signaling sequence to at least one terminal (4 to 14). In order to evaluate the signaling sequences transmitted by the terminals, the base station (1 to 3) includes a device (21, 22) for correlating a received signaling sequence and for detecting the pulse arising from a received and correlated signaling sequence.

18 Claims, 4 Drawing Sheets

WIRELESS NETWORK

FIELD OF INVENTION

The invention relates to a wireless network with at least one base station and a plurality of associated terminals for the exchange of useful data and control data.

BACKGROUND OF THE INVENTION

The document "ETSI SMG2, Meeting No. 24, Cork Ireland, Dec. 1–5, 1997, Tdoc SMG2 359/97, Concept Group Alpha—Wideband Direct-Sequence CDMA (WCDMA), EVALUATION DOCUMENT (3.0), Part 1: System Description, Performance Evaluation" proposes a radio network operating on the basis of CDMA (CDMA= Code Division Multiplex Access). The radio network consists of a plurality of radio cells with a respective base station and terminals or mobile stations present therein. After the registration and synchronization of a terminal, for example in the case of a request for a channel, a terminal transmits a random access burst via a random access channel (RACH). The random access burst consists of a preamble part and a data part. The preamble part consists of 16 symbols (preamble sequence) which is spread by an orthogonal Gold code (preamble code). The orthogonal Gold code contains 256 chip intervals. The data part contains a field with an identification for the terminal, a field for characterizing the requested service (short packet transmission, dedicated channel set-up etc.), an optional field for data packets (optional user packets) and a CRC field for error detection. A random access burst received by a base station is applied, via a matched filter, a preamble correlator and a peak detector, to a circuit section which estimates the time behavior of the data part and controls a RAKE circuit for evaluating the data part. Thus, in this case use is made of peak detection, based on correlation, and subsequent by message decoding. 80 random access channels are available to the terminals associated with a base station. These channels are determined by 16 different preamble codes and 5 different transmission instants. If two or more terminals transmit via the same random access channel, i.e. the same preamble code and the same transmission instant are chosen, a collision occurs and the information transmitted by the terminals cannot be correctly evaluated by the base station. Such collisions are likely notably in the case of high traffic loads.

SUMMARY OF THE INVENTION

It is an object of the invention to provide a wireless network in which a terminal exchanges signaling information with the associated base station in a different manner.

This object is achieved by means of a wireless network of the kind set forth which is characterized in that the base station is arranged to transmit the starting instant of at least one signaling sequence of at least one terminal, and that the base station includes a device for correlating a received signaling sequence and for detecting the pulse arising from a received and correlated signaling sequence.

In the context of the present application a wireless network according to the invention is to be understood to mean a network with a plurality of radio cells in which a respective base station and a plurality of terminals transmit control data and useful data in a wireless manner. A wireless transmission is intended to transmit information, for example via radio, ultrasound or infrared channels.

After registration and synchronization, a terminal must request a given useful channel from the associated base station in order to transmit useful data. Such a useful channel may be, for example a dedicated channel (for example, for the transmission of speech) either between the base station and the terminal or between two terminals. The channels are allocated by the base station. In accordance with the invention, a terminal transmits, via a signaling channel allocated by the base station, a request, for example for a dedicated channel. The base station should provide the terminal with at least the starting instant of a signaling sequence possibly known in advance. It is alternatively possible that, in addition to the starting instant, the terminals are also assigned one of a plurality of signaling sequences. A signaling sequence of this kind is a Gold or Kasami sequence having suitable autocorrelation and cross-correlation properties. The base station includes a device (for example, a matched filter) in which the received signaling sequences are correlated. The pulse resulting from the correlation is detected and assigned to a terminal. Because in the network according to the invention collisions are avoided because of the different starting instants of the signaling sequences and because no message decoding is performed after peak detection based on a correlation, but instead the occurrence of the pulse resulting from the signaling sequence is considered to be a signaling request, in comparison with the state of the art signaling detection can be performed in a more robust and faster manner, notably in the case of high traffic loads.

In order to detect a signaling sequence, a given time interval is selected for peak detection in dependence on the starting instant of the signaling sequence and on the channel properties. Such a time interval is referred to as a detection window. The length or duration and the starting instant of the detection window must be chosen in such a manner that peak detection is possible. The detection windows are smaller than the duration of the random access bursts known from the state of the art. Using the signaling according to the invention, therefore, many terminals can transmit a signaling request within a brief period of time.

In order to transmit a signaling sequence, after the registration and synchronization, a terminal in a radio cell always has the same starting instant in relation to a reference frame for as long as the base station does not explicitly change the starting instant. A signaling channel is thus permanently claimed for a terminal. Because many of such starting instants may be present in the reference frame of short duration (for example, 10 ms) and because all terminals of a radio cell use the same signaling sequence, the permanent assignment of a starting instant and a signaling sequence to a terminal requires only few network resources.

The signaling sequences of all terminals in a radio cell have different starting instants. In the simplest case the same signaling sequences are used by each terminal. The signaling sequences, therefore, may partly overlap, because the length of a sequence is usually greater than the spacing of two successive starting instants.

Another advantage of the network according to the invention consists in the reliability of the recognition of a signaling request. A detectable pulse is generated practically always after transmission of a signaling sequence. This is because interference signals and channel noise may cause "artificial" pulses at the output of the matched filter. It is very unlikely that they reduce the amplitude of the pulses at the output of the matched filter upon reception of an actually transmitted signaling sequence. In the worst case (for example, in the case of faults), a fault alarm is thus triggered if the amplitude of the noise or interference signal exceeds the detection threshold without a signaling sequence having been transmitted.

Patent claim 2 describes the characteristics for the correlation of the signaling sequences by means of a matched filter and the detection of the pulse by means of a peak detector. claim 3 describes the instant of transmission of the signaling sequence or signaling sequences to be used for the signaling, and the starting instants thereof, via a control channel. It is to be noted that the signaling sequence or sequences to be used for signaling are associated with only one base station only and not with its neighboring base stations. A Kasami or Gold sequence can be used as the signaling sequence (claim 4). However, the use of other orthogonal square-wave signals is not precluded.

The starting instants of the same signaling sequences may either be situated at the same constant distance from one another or at an individually determined distance (claims 5 and 6). In the former case the constant distance is dependent, for example on the worst channel properties, whereas in the second case it is dependent on the respective channel properties between the base station and the relevant terminal.

The claims 7 and 8 describe the characteristics for the transmission of 1-bit signaling information and n-bit signaling information, respectively (n>1 and integer). Furthermore, different signaling sequences can be transmitted in a radio cell when the traffic load is very high and no further starting instants of a signaling sequence can be allocated (claim 9).

The claims 10 to 12 relate to embodiments of a base station and a terminal.

The wireless network according to the invention is further advantageous in that the amplitude of the signaling sequence can always be adapted to certain network requirements. If the amplitude of the signaling sequence is too low, it is increased (claim 13). This may also be effected—as described in patent claim 2—by a step-by-step adaptation process. This process ends if an acknowledgement is given by the assigned base station within a predefined period of time or if the signaling sequence has maximum amplitude. Such an acknowledgement is, for example, the assignment of a user channel to the terminal (claim 15).

The invention also relates to a method of exchanging useful data and control data between at least one base station and a plurality of associated terminals in a wireless network, to a base station in a wireless network for the exchange of useful data and control data with a plurality of associated terminals, and to a terminal in a wireless network for the exchange of useful data and control data with at least one base station.

BRIEF DESCRIPTION OF THE DRAWINGS

Embodiments of the invention will be described in detail hereinafter with reference to the Figures. Therein.

DETAILED DESCRIPTION

Figure 1:
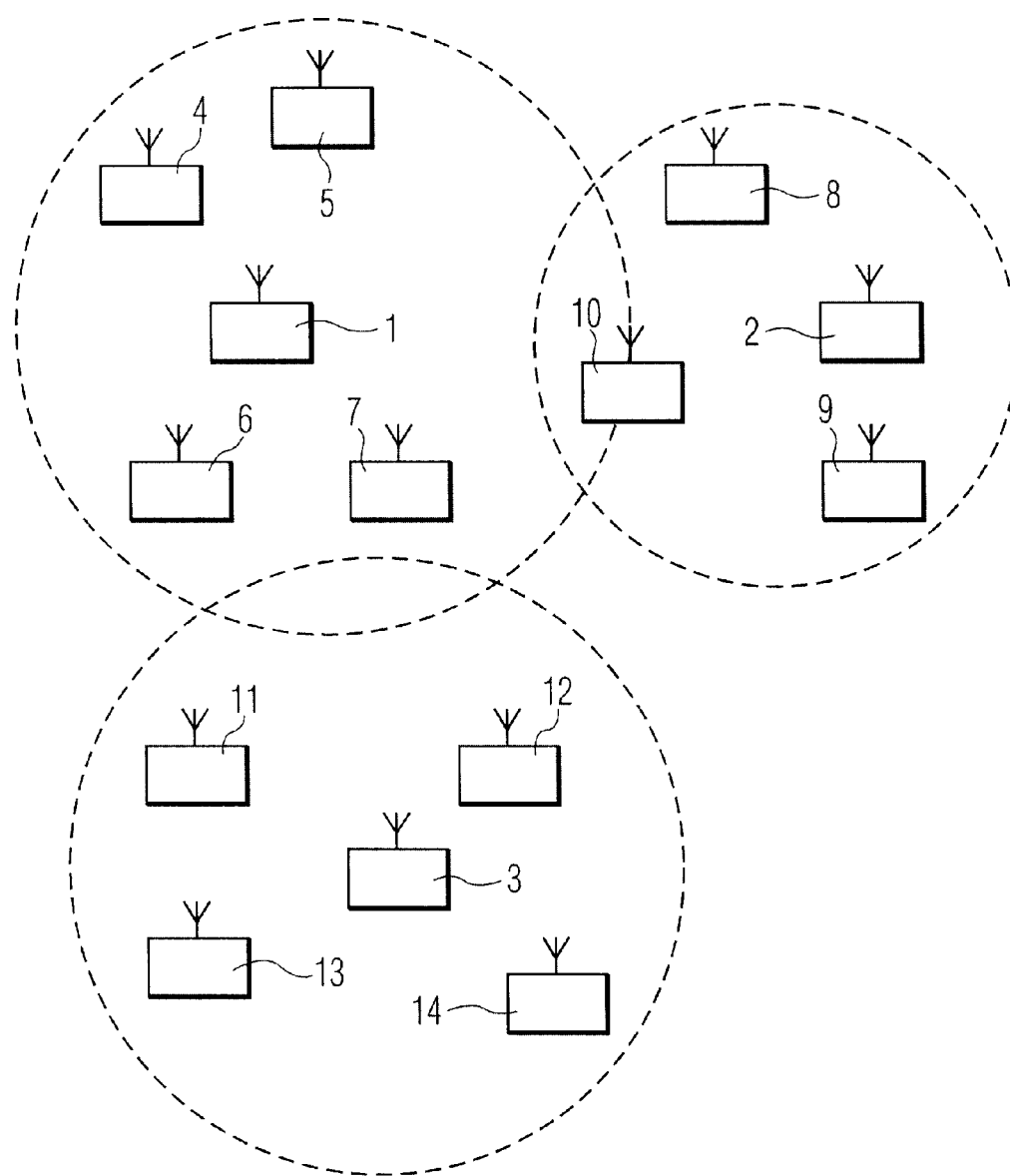
FIG. 1 shows a wireless network with a plurality of base stations and terminals.

FIG. 1 shows a wireless network, for example a radio network, with a plurality of base stations 1 to 3 and a plurality of terminals 4 to 14. Given terminals 4 to 14 are associated with a base station 1 to 3. In the example shown in FIG. 1, the terminals 4 to 7 are associated with the base station 1, the terminals 8 to 10 being associated with the base station 2 and the terminals 11 to 14 with the base station 3. An exchange of control data takes place at least between the base station and the terminals. A useful data exchange can take place between the base station and the terminals as well as directly between the terminals. In both cases the link for the transmission of useful data is established by the base station. The terminals 4 to 14 are usually mobile stations which are controlled by a stationary base station 1 to 3. A base station 1 to 3, however, may also be mobile.

In the wireless network, for example radio signals are transmitted in conformity with the FDMA, TDMA or CDMA method (FDMA=frequency division multiplex access, TDMA=time division multiplex access, CDMA= code division multiplex access) or in conformity with a combination of these methods.

According to the CDMA method, being a special code spreading method, binary information (data signal) originating from a user is modulated each time with a different code sequence. Such a code sequence consists of a pseudo-random square-wave signal (pseudo noise code) whose rate, also referred to as chip rate, generally is significantly higher than that of the binary information. The duration of a square-wave pulse of the pseudo random square-wave signal is referred to as the chip interval $T_c$. $1/T_c$ is the chip rate. The multiplication or modulation of the data signal with the pseudo random square-wave signal causes a spread of the spectrum by the spreading factor $N_c=T/T_c$, where T is the duration of a square-wave pulse of the data signal.

The base stations are associated with specific radio cells in which the data traffic with the relevant terminals present in the radio cells takes place. When a terminal moves from one radio cell into another radio cell, the allocation of the terminal is transferred from one base station to another in conformity with given specifications. Such a terminal can then simultaneously exchange data with the base stations of both radio cells upon changing over from one radio cell to another. This is referred to as a soft hand-over. A radio cell is denoted by a dotted circle in FIG. 1.

Useful data and control data are transferred between at least one terminal and a base station by way of channels specified by the base station. The radio link from the base station to the terminals is referred to as a down-link and that from the terminals to the base station as an up-link. Thus, data is transmitted from the base station to the terminal via down-link channels whereas data is transmitted from the terminals to the base station via up-link channels. For example, there may be provided a down-link control channel which is used to distribute control data from the base station to all terminals prior to the establishment of a link. A channel of this kind is referred to as a down-link distribution control channel or broadcast control channel. In order to transmit control data prior to the establishment of a link from a terminal to the base station, for example use can be made of an up-link control channel which is assigned by the base station but can also be accessed by other terminals. An up-link channel which can be used by several or all terminals is referred to as a common up-link channel. After the establishment of a link, for example between a terminal and the base station, useful data is transmitted via a down-link channel and an up-link channel. For the direct transmission of useful data between two terminals use is made of channels which are referred to as peer-to-peer useful channels. Channels which are established only between one transmitter and one receiver are referred to as dedicated channels. Generally speaking, a useful channel is a dedicated channel which can be accompanied by a dedicated control channel for the transmission of link-specific control data.

A channel is defined by a frequency range, a time interval and, for example in the case of the CDMA method, by a spread code. In order to enable the exchange of useful data between the base station and a terminal it is necessary to synchronize the terminal with the base station. For example, from the GSM system (GSM=Global System for Mobile communication), utilizing a combination of FDMA and TDMA methods, it is known that after the determination of a suitable frequency range on the basis of specified parameters, the temporal position of a frame (frame synchronization) is determined in order to sequence the transmission of data. Such a frame is always required for the data synchronization of terminals and base station in the case of the TDMA, FDMA and CDMA methods. A frame of this kind may include several sub-frames or form a super-frame in conjunction with a plurality of other, successive frames. For reasons of simplicity, the following description is based on the assumption of one frame which is referred to as a reference frame.

In order to enable frame synchronization, all terminals must be synchronized with the base station by means of pulses transmitted by the base station. If no code spreading method (for example, CDMA method) is used (for example, use is made of a TDMA method), the pulse duration corresponds exactly to the time interval required for the transmission of one bit. When use is made of a code spreading method, the pulse duration corresponds to one chip interval. A bit interval then corresponds to a plurality of chip intervals. The frame synchronization requires the transmission of a special pulse sequence by the base station. The starting instant of the pulse sequence corresponds to the starting instant of a frame.

Hereinafter it will be assumed that the terminals have already been synchronized with the base station and registered therein. Before a terminal (for example, one of the terminals 4 to 7 in FIG. 1) can transmit and receive useful data, it must be allocated a useful channel by the associated base station (for example, the base station 1 in FIG. 1) for a down-link and an up-link connection or a peer-to-peer useful channel. To this end, the base station (for example, the base station 1 in FIG. 1) supplies the associated terminals (for example, the terminals 4 to 7) with control data, via a down-link broadcast control channel during a frame which can be selected at random. This control data informs the terminals as to the instant (sequence starting instant), relative to the frame, at which the terminals may transmit a special signaling sequence. Such a signaling sequence transmitted by a terminal is a pseudo-random square-wave signal and indicates that the relevant terminal requests a useful channel. Therefore, in order to transmit a signaling sequence, the base station allocates each terminal an up-link signaling channel via which signaling sequences are transmitted. In order to limit the transmission of control data, the base station can execute the allocation of the signaling sequence and the sequence starting instant only once for each terminal. This can take place, for example during the registration of a terminal at the associated base station. The allocation of the sequence starting instants, however, can also take place (as described in detail hereinafter) in dependence on the different channel properties of the links between base station and terminals. A signaling channel according to the invention is realized by the given signaling sequence and its starting instant.

All terminals associated with a base station transmit the same signaling sequence, be it at different instants (sequence starting instants). Consequently, different base stations allocate different signaling sequences to their associated or registered terminals. In this respect it suffices, however, when only the neighboring base stations have respective, different signaling sequences. When a terminal is registered in two base stations, for example upon a change over from one radio cell to another, it transmits the signaling sequence specified by the base station wherefrom a useful channel is requested.

A base station includes a single matched filter and a subsequent peak detector for the detection of the signaling sequences transmitted by the terminals. The matched filter is clocked at a clock rate which is at least equal to the maximum chip rate when use is made of code spreading or equal to the maximum bit rate if code spreading is not used. The terminals transmit signaling sequences which have a suitable autocorrelation property. This means that the pulses which occur at the output of the matched filter and stem from successive signaling sequences from different terminals can be unambiguously detected within a detection window by the peak detector. The choice of the clock rate in dependence on the maximum chip rate or bit rate and a signaling sequence having suitable autocorrelation properties enable a minimum temporal distance between the starting instants of the successive signaling sequences. Furthermore, the signaling sequence should also have a suitable cross-correlation property, i.e. there should be little correlation only with other signals to be transmitted in the network. Thus, on the one hand the other signals transmitted in the network and received by the matched filter are interpreted as a negligible noise signal by the peak detector, whereas on the other hand the signaling sequences are interpreted as a negligible noise or interference signal by other circuit elements in the base station which process the other signals transmitted in the network. A signaling sequence of this kind, having suitable autocorrelation properties and cross-correlation properties, is, for example the Gold and Kasami sequence which is known from the book "J. G. Proakis: Digital Communications by J. G. Proakis, Third Edition, McGraw-Hill International Editions, 1995, pp. 724 to 729.

The pulses appearing at the output of the matched filter are a measure of the energy of the signaling sequences. The length and the amplitude of the signaling sequence, being low as opposed to the other signals to be transmitted, thus determine the pulse level at the output of the matched filter.

The sequence starting instant of a signaling sequence should be defined by the base station in such a manner that the matched filter in the base station generates a pulse after detection of a signaling sequence from a terminal associated therewith in a predetermined detection window. This detection window has a duration or length δ.

Figure 2:
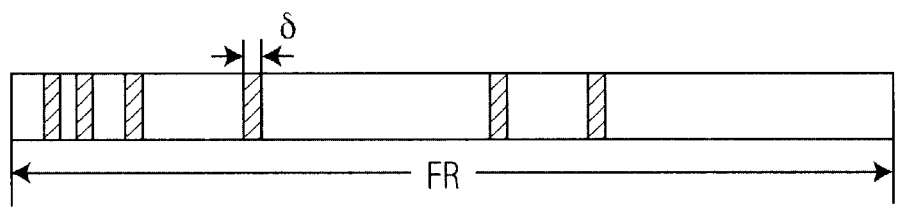
FIGS. 2 and 3 show sequences of detection windows for a matched filter, used in a base station, in relation to a reference window.

The signaling sequences can in principle be transmitted at arbitrary sequence starting instants. A sequence starting instant is linked to the appearance of a pulse at the output of the matched filter. The detection commences after the transmission of a signaling sequence and a delay which is imposed by the channel property of a link between at least one terminal and a base station. A channel property is to be understood to mean the physical characteristics of a channel. A channel property stems, for example from the distance between a terminal and a base station. Consequently, it may be that the peak detector utilizes detection windows of different width for the various terminals. For the sake of simplicity, however, a uniform width of the detection window is chosen herein. FIG. 2 shows the succession of arbitrarily occurring detection windows of duration δ in relation to the reference frame of length FR. On the basis of a received signaling sequence the matched filter usually generates a pulse sequence with a main pulse and several subsidiary pulses which are usually symmetrically distributed about the main pulse. The amplitude of the subsidiary pulses is regularly lower than the amplitude of the main pulse.

The various main pulses generated by the matched filter must have an adequate guard time in order to ensure that the pulse sequences from the various terminals, appearing at the output of the matched filter and distorted by the channel, do not overlap in such a manner that unambiguous detection is impossible. In the case of a given overlap, the base station cannot unambiguously attribute the pulses to a terminal. The width or duration δ of the detection window, therefore, must be at least equal to the width of the main pulse, as it occurs without influencing by the channel, plus an additional, channel-dependent safety interval. This also offers the distance between successive, equal signaling sequences. However, the temporal distances of two different signaling sequences from different base stations need not be taken into account, because the weak correlation ensures that a peak detector succeeding the matched filter detects a signaling sequence from another base station or radio zone as non-disturbing noise.

Figure 3:
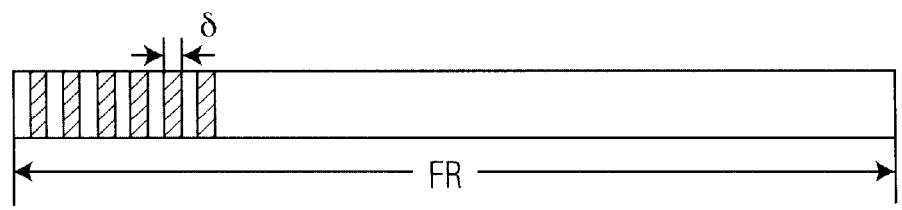
Figure 4:
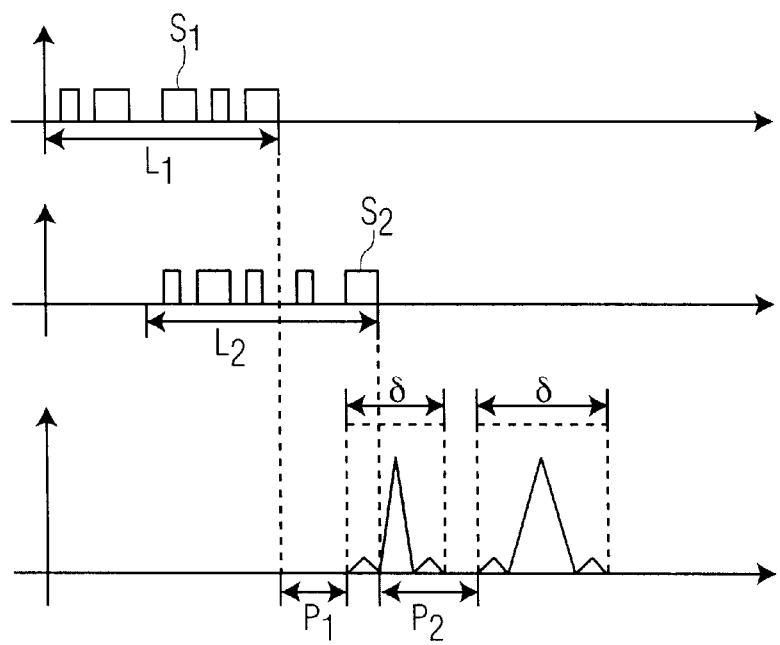
FIG. 4 shows, by way of example, signaling sequences transmitted by two terminals and the corresponding detection windows.

In order to enable the transmission of as many signaling sequences as possible within a predetermined time interval, according to the invention the spacing of the sequence starting instants may be optimized. This means that the width of the detection window is always determined in dependence on the channel properties between a terminal and the base station. Another possibility according to the invention, which can be realized in a simpler manner, consists in that transmitting the signaling sequences successively with a constant spacing. The determination of the constant spacing should take into account the poorest channel properties. FIG. 3 shows the continuously successive detection windows in relation to the reference frame of length FR, occurring as a result of the signaling sequences transmitted with a predetermined constant spacing. FIG. 4 shows, by way of example, two signaling sequences $S_1$ and $S_2$ which have the sequence duration or sequence length $L_1$ and $L_2$, respectively. After a delay time $p_1$ and $P_2$, imposed by the channel properties, the detection operation or the detection window of length δ commences. A main pulse and subsidiary pulses associated with a signaling sequence occur in such a detection window.

The length δ of the detection window is determined notably by three factors (channel properties). First of all, the accuracy of the estimate of the propagation delay of the data to be transferred from the terminal to the base station must be taken into account, and secondly the delay spread characteristic on the basis of multi-path, and thirdly the autocorrelation properties of the signaling sequences of the terminals.

The terminals in a radio cell are usually situated at different distances from the base station. This leads to different propagation delays of the signaling sequences transmitted by the terminals. The propagation delay between the terminal $MT_i$ and the base station B should be equal to $p_i$ and the length of the signaling sequence should be equal to L. When the base station expects a pulse for the terminal $MT_i$ at the output of the matched filter at the instant $t_i$, it instructs the terminal $MT_i$ to start the transmission of the signaling sequence at the instant $t_i$-$p_i$-L. However, because of the limited accuracy of the estimate of the propagation delay $p_i$, the pulse at the output of the matched filter is inherently inaccurate. This inaccuracy in the estimate of the propagation delay $p_i$ must be compensated by a sufficiently long detection window δ. When the maximum inaccuracy of the estimate amounts to j for all terminals, the detection window must be larger than j.

The data between a terminal and a base station usually are not transmitted via only one radio link but via several links (multi-path). Because of reflection and deflection effects, the signal transmitted from a terminal to the base station travels via different paths and the signals resulting therefrom and traveling along different paths are received by the base station at different instants. Consequently, at the output of the matched filter not a single main pulse appears for a signaling sequence, but also further main pulses. These further main pulses occur at the output of the matched filters because of signals produced by the multi-path transmission and grouped around the actual main pulse. The actual main pulse arises at the output of the matched filter from the actual received signaling sequence. Therefore, the length δ of the detection window must be larger than a window of length w which contains the actual main pulse and the further main pulses. It is to be noted that even in the absence of multi-path, not only an actual main pulse occurs at the output of the matched filter but also subsidiary pulses. However, because of the described suitable autocorrelation properties, the amplitude of the subsidiary pulses is much lower than the amplitude of the main pulse.

The autocorrelation property of the signaling sequence is the measure of the width of the main pulse and the minima and maxima of the subsidiary pulses at the output of the matched filter (without taking into account the channel properties). In the case of a Gold or Kasami sequence, the main pulse at the output of the matched filter is approximately equal to the energy of the signaling sequence as stated above. The amplitude of the main pulse is then much higher than that of the subsidiary pulses. The energy of the signaling sequence is thus determined by its amplitude and duration or length. In order to reduce the interference with other signals, the amplitude of the signaling sequence (for example, a Gold or Kasami sequence) must be significantly than that of the other signals. However, in order to enable detection of a signaling sequence by means of the matched filter, the signaling sequence must be sufficiently long. The detection duration of a signaling sequence is thus prolonged and hence also the allocation by the base station of useful channels to the terminal having transmitted a signaling sequence(prolongation of the signaling time). The length of a signaling sequence thus influences the autocorrelation property of the signaling sequence as well as the signaling time. When the autocorrelation function for a given signaling sequence is sufficiently large within a time interval q, δ must be larger than q.

It is to be noted that the length or duration δ of the detection window must be chosen to be equal to the sum of the values of j, w and q:

$$\delta = j + w + q.$$

Thus far, a description has been given of the case where the duration δ of the detection window is proportioned in such a manner that only a single signaling sequence can be detected. This means that a base station receives a binary information or 1-bit information. This binary information indicates whether a terminal, having transmitted a signaling sequence, requests a new useful signal (pulse present at the output of the matched filter during the duration of the detection window) or no useful channel (pulse absent at the output of the matched filter during the duration of the detection window). Hereinafter the extension of the transmission from 1-bit to n-bit information (n>1 and integer) will be described. A terminal then transmits the same signaling sequence not once but several times in succession within each reference frame in order to make n-bit information available to the base station. This extension from 1-bit to n-bit information is achieved by prolongation of the detection window in that the duration or length of the detection window is increased by the factor n for each terminal concerned. During the occurrence of the n-times enlarged detection window, n signaling sequences from a terminal can thus be detected. The terminal transmitting n-bit information (signaling data) utilizes the same signaling sequences whose starting instants have been shifted each time by the value δ. A transmitted signaling sequence then indicates, for example a "1" and a non-transmitted signaling sequence indicates a "0".

Figure 5:
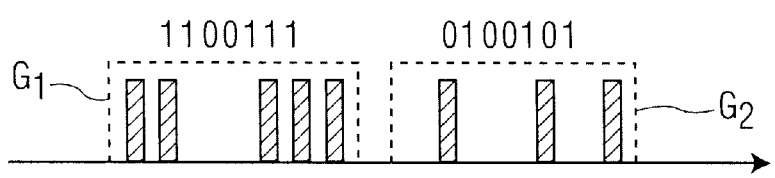
FIG. 5 shows the position of the pulses, formed from the detection of signaling sequences, for the transmission of n-bit signaling information.

FIG. 5 shows an example of the position of pulses detected from identical signaling sequences. A first group G1 of pulses is associated with signaling sequences of a first terminal and a second group G2 of pulses is associated with signaling sequences of a second terminal. The 7-bit information "1100111" results from the group G1 and the information "0100101" from the second group G2.

The transmission of n-bit information by a terminal enables various signaling applications. For example, the information "000", corresponding to non-transmission of three successive signaling sequences, may mean that the terminal does not request a useful channel. The information "001" may mean that the terminal requests an 8-kbit/s useful channel. Two non-transmitted signaling sequences and one transmitted signaling sequence produce the information "001". A terminal can express the request for a 64-kbit/s useful channel by way of the information "010" and the request for a 144-kbit/s useful signal by way of the information "011".

The matched filter in the base station is then arranged for the reception of 1-bit as well as n-bit information, because the same signaling sequence is received in both cases. In these two cases the only difference consists in the post-processing of the pulses detected by the matched filter. In the former case information processing takes place after the period $\delta$ for the detection of a signaling sequence and in the second case after the period $n\delta$ for the detection of n signaling sequences.

A further aspect of the invention concerns the increase of the number of signaling channels. The number of signaling channels of a base station is limited to the value $FR/\delta$ when a single signaling sequence i used; therein, FR denotes the length of the reference frame and $\delta$ the length of a detection window. In this respect it is assumed that only 1-bit information is transmitted and that each detection window has the same length $\delta$. Should a base station wish to allocate more signaling channels than given by the value $FR/\delta$, it can assign the terminals different signaling sequences instead of only a single signaling sequence. For example, during a reference frame 100 identical signaling sequences can be detected by the matched filter. However, if 120 terminals wishing to transmit a signaling sequence are present within the radio cell, it is not possible to use the same signaling sequence for all of said 120 terminals. Therefore, for example 60 terminals can transmit a first signaling sequence and the other 60 terminals a second signaling sequence; these sequences can then be detected by two different matched filters in the base station. It is also to be noted that the sequence starting instants of the different signaling sequences are independent of one another, so that they need not be coordinated. It is only necessary to adapt the starting instants of the same signaling sequences to one another.

When a signaling sequence is transmitted to a base station, attention should be paid to the fact that the amplitude of the signaling sequence (compare FIG. 4) is neither too high nor too low, because with specific methods (for example, CDMA method) the amplitude of the transmitted signaling sequence is to be adapted to the distance to the assigned base station. Too high amplitude, for example, in a CDMA system, means.that an interference to other signals may arise. As a result, the capacity of the overall system is reduced. Too low amplitude means that a signaling sequence cannot be received correctly, because it cannot be correctly detected in the base station as a result of the interference by other signals and/or noise signals.

For solving this problem, a terminal can transmit a signaling sequence with low amplitude that can be received sufficiently well by a base station under normal circumstances. When this signaling sequence has been detected by the assigned base station, the base station assigns a requested channel to the terminal. After the reception of the message, the terminal transmits no further signaling sequence.

When after the transmission of a signaling sequence the terminal does not receive an acknowledgement from the assigned base station after a predefined period of time, it transmits a new signaling sequence with higher amplitude. When the terminal does not receive an allocation from the base station within a predefined period of time, a further signaling sequence is transmitted with again higher amplitude. This process is repeated until a predefined maximum value for the amplitude has been reached, or until the terminal has received a channel allocation from the base station.

In the case where after a predefined period of time a terminal has not received an acknowledgement for a signaling sequence having the maximum permissible amplitude, this total process is repeated after a certain random period of time, or a signaling is dispensed with.

When the amplitude of the signaling sequence is lowest possible, another problem may occur under certain circumstances. This problem relates to the increase of the false alarm rate (FAR). A false alarm rate is equal to the probability that the pulse detector connected downstream of the matched filter detects a pulse although no signaling sequence has been transmitted.

This problem with the increase of the false alarm rate may be solved in that the base station not immediately allocates a channel after the detection of a signaling sequence, but that the base station waits with its allocation until a plurality of signaling sequences (h signaling sequences, with h>1) in g (g>1) successive frames have been detected in the detection window provided. If the false alarm rate for a detected pulse in the base station is equal to p, the false alarm rate for h successive detected pulses is reduced to $p^h$.

The invention can be taken up in any mobile radio system in existence or yet to be introduced, for example GSM or UMTS (UMTS=Universal Mobile Telecommunication System) based on WB-CDMA or CD/TDMA as additional circuit components. The FIGS. 6 to 9 show a receiver (FIG. 6) and a transmitter (FIG. 7) of a base station and a receiver (FIG. 8) and a transmitter (FIG. 9) of a terminal.

Figure 6:
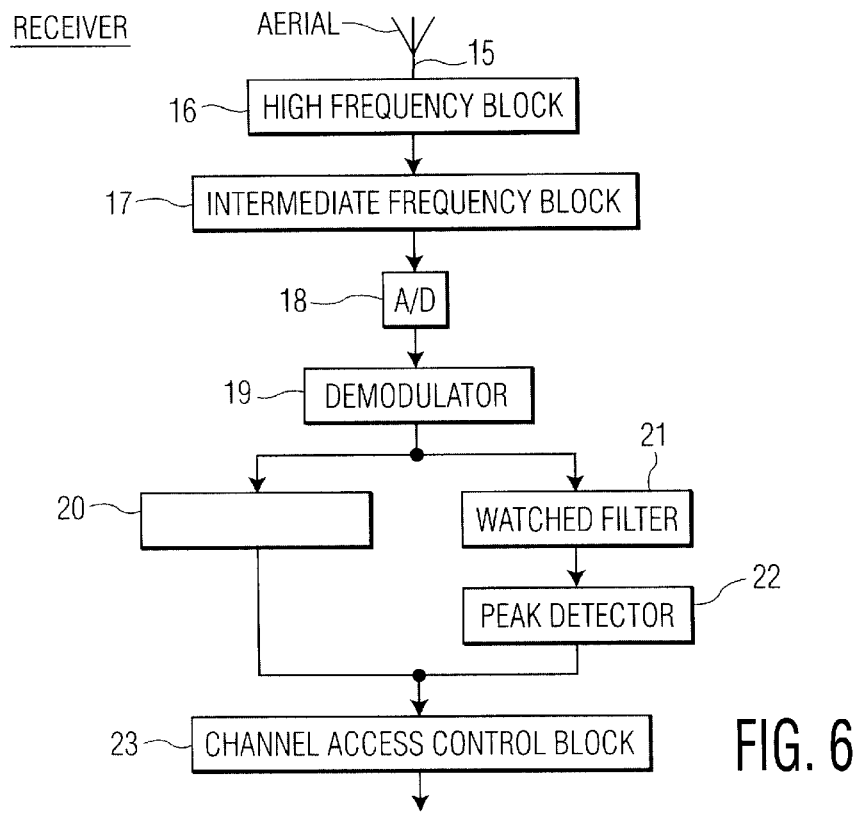
FIG. 6 shows a receiver of a base station.

The block diagram of a receiver of a base station as shown in FIG. 6 includes known elements (for example, known from the GSM mobile radio system or a CDMA system) such as an aerial 15, a high-frequency block 16, an intermediate frequency block 17, an analog-to-digital converter 18, a demodulator 19 and a block 20 which executes, for example the switching functions of channel demultiplexing, de-interleaving, channel decoding and, when use is made of a CDMA system, also de-spreading. The control and useful signals presented in the baseband are applied to a channel access control block 23 which conducts the various signals to the relevant units for further processing, for example to an exchange. According to the invention, the receiver of the base station is provided with a matched filter 21 which checks the received signals for the presence of a signaling sequence. If a signaling sequence is detected during the expected time interval (detection window), i.e. if at least one pulse is generated, it is detected by a subsequent peak detector 22 and signaled to the channel access control block 23 which may be, for example a processor. The channel access control block 23 applies this message to subsequent, further control elements (not shown herein) which then allocate, via the transmitter of the base station, a useful channel to the terminal, for example by means of generated control data.

The duration or length $\delta$ of the detection window may be fixed and defined, for example by measurements prior to normal operation of the network. The duration $\delta$ of the detection window can also be determined for each terminal individually during operation. The duration δ of the detection window for a given signaling sequence and a terminal is in this case applied, by a control element (not shown), to the peak detector after the evaluation of measuring results. In the case of the GSM mobile radio system, for example the distance between a base station and a terminal is evaluated in the base station on the basis of signals received from the terminal.

The processing of the pulses determined by the peak detector 22 and produced by the matched filter 21 takes place in the channel access control block 23. A given detection window is assigned to a terminal. When at least one main pulse is detected in such a detection window, the channel access control block 23 determines that a request from the terminal for a useful channel is involved. On the basis of this request, and requests from further terminals, and taking into account the existing links or the already allocated useful channels, a control element (not shown) decides, after reception of the request from the channel access control block 23, whether a useful channel can be allocated to a requesting terminal. When a useful channel can be allocated, it is determined and applied to the terminal, after processing in the transmitter of the base station (FIG. 7), via a down-link broadcast control channel.

Figure 7:
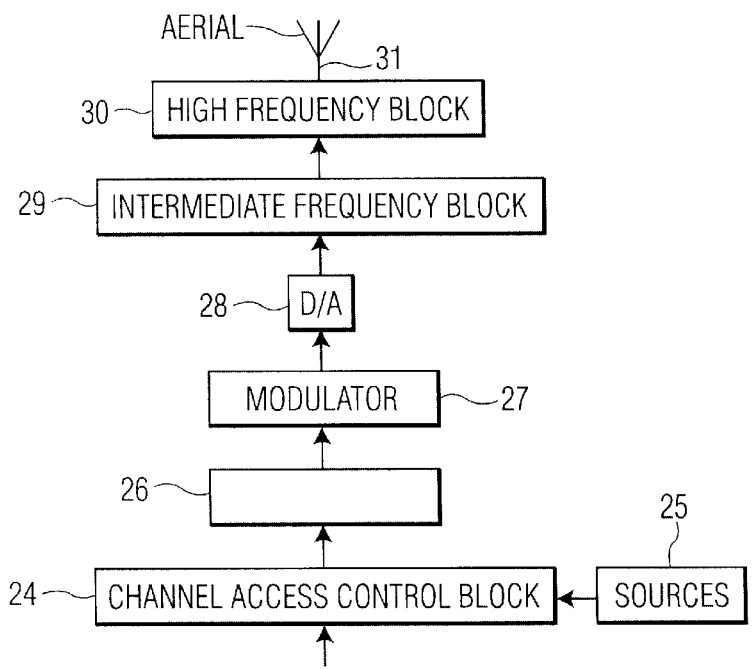
FIG. 7 shows a transmitter of a base station.

The transmitter of the base station as shown in FIG. 7 also includes a channel access control block 24 which receives data from various sources 25. One such source may be, for example an exchange, supplying useful data, or a control element which supplies control data. For example, this control data may contain information as regards a useful channel to be used for a terminal having previously requested a useful channel by way of a signaling sequence. The control block 24 is succeeded by a block 26 which executes, for example the switching functions of channel encoding, interleaving, channel multiplexing and, when use is made of a CDMA system, also spreading. The output signal of the block 26 is applied to an aerial 31 via a modulator 27, a digital-to-analog converter 28, an intermediate frequency block 29 and a high frequency block 30. All elements 25 to 31 may be elements which are known from existing mobile radio systems. .

Figure 8:
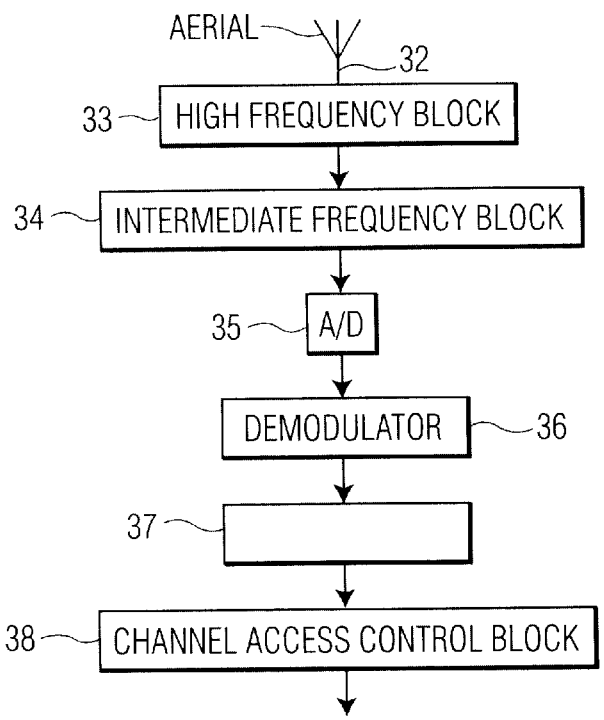
FIG. 8 shows a receiver of a terminal.

FIG. 8 shows a block diagram of a receiver of a terminal. This receiver includes elements which are known, for example from the GSM mobile radio system or a CDMA system, i.e. an aerial 32, a high-frequency block 33, an intermediate frequency block 34, an analog-to-digital converter 35, a demodulator 36, a block 37 with various functions, and a channel access control block 38 which applies control and useful data to various drains (for example, a low-frequency circuit for converting useful data into speech data). The block 37 is responsible, for example for the switching functions channel demultiplexing, de-interleaving, channel decoding and, when use is made of a CDMA system, de-spreading. The channel access control block 38 evaluates given channels which are relevant to the terminal, for example a useful channel or a down-link distribution control channel. This information is conducted to given other switching elements (not shown herein) in the terminal. From the down-link distribution control signal the channel access block 38 derives, for example the information as to which starting instant at least one signaling sequence can be transmitted. This information is applied to at least one circuit element which is not shown herein.

Figure 9:
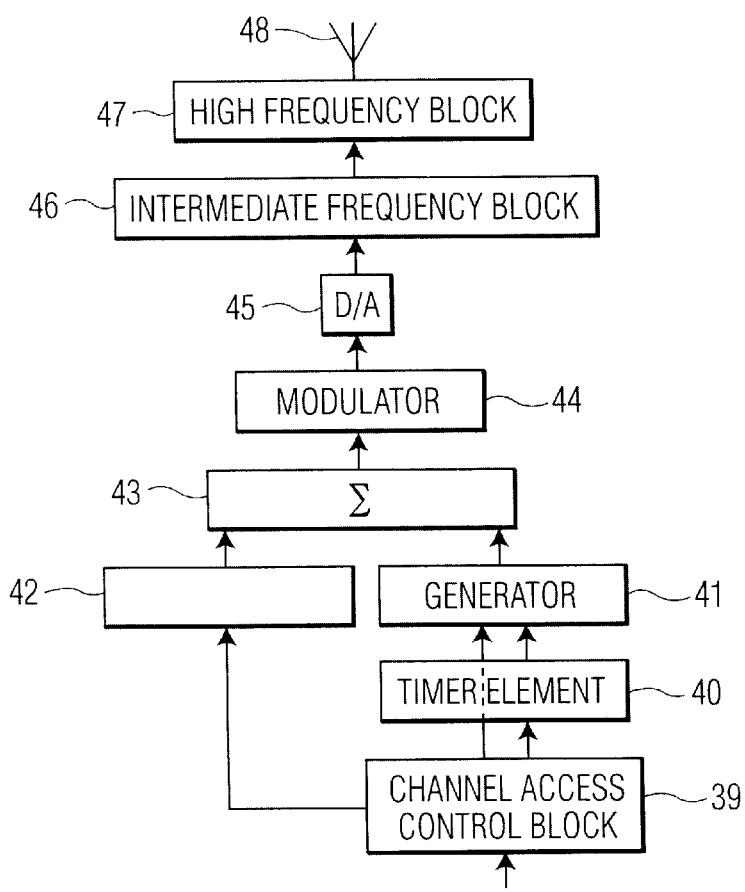
FIG. 9 shows a transmitter of a terminal.

FIG. 9 shows the block diagram of the transmitter of the terminal, which also includes a channel access control block 39 which controls a channel access. The channel access control block 39 serves a block 42 which performs, for example the switching functions channel encoding, interleaving, channel multiplexing and, when use is made of a CDMA system, also spreading. The channel access control block 39 also indicates the starting instant of a signaling sequence to a timer element 40. The channel access control block 39 receives the useful and control data from various sources. One such source may be, for example a low-frequency circuit which supplies speech data as useful data, or a control element which supplies control data. For example, this control data may be information concerning the starting instant of a signaling sequence. The timer element 40 applies time markers to a generator 41 in order to generate a signaling sequence. The time markers may be, for example the starting and terminating instants of square-wave pulses of the signaling sequence. The generator includes a memory for storing various signaling sequences. The signaling sequence to be transmitted is selected by the channel access control block. If desired, signaling sequences may be written into the memory of the generator 41. The generator 41 and the timer element 40 are initialized after reception of the information concerning the signaling sequence to be used and the starting instant of the signaling sequence. If the associated base station does not indicate any change of the signaling sequence and/or the starting instant, further initialization of the generator 41 and the timer element 40 will not be necessary.

The useful and control data processed in the block 42 are applied to a superposition circuit 43 which also receives the output signals of the generator 41. The output signal of the superposition circuit 43 is applied, via a modulator 44, a digital-to-analog converter 45, and an intermediate frequency block 46, to a high frequency block 47 which transmits, via an aerial 48, the signals generated in the high-frequency block.

What is claimed is:

1. A wireless network which includes at least one base station and a plurality of associated terminals for the exchange of useful data and control data, characterized in that the base station is arranged to transmit information representative of a starting instant of at least one signaling sequence of at least one terminal, and the base station includes a device for correlating a received signaling sequence and for detecting a pulse arising from the received and correlated signaling sequence.

2. A wireless network as claimed in claim 1, characterized in that the base station includes a matched filter for generating at least one pulse after the reception of the signaling sequence, and a peak detector, and the peak detector is arranged to detect at least one pulse associated with one of the terminals during a given detection window whose starting instant and duration are determined by the channel properties and the starting instant of the signaling sequence.

3. A wireless network as claimed in claim 1, characterized in that a base station is arranged to transmit, after the registration and synchronization of one of the terminals, the signaling sequence or signaling sequences to be used for the signaling and also to transmit the starting instants thereof, via a control channel, to the relevant terminal, and the signaling sequence or signaling sequences to be used for signaling are associated only with said base station but not with its neighboring stations.

4. A wireless network as claimed in claim 1, characterized in that in the case of a signaling request a terminal (4 to 14) is arranged to transmit a Kasami or Gold sequence as the signaling sequence at an instant defined by the associated base station (1 to 3).

5. A wireless network as claimed in claim 1, characterized in that the starting instants of the same signaling sequences, applied to the associated terminals (4 to 14) by the base station (1 to 3), always lie at the same minimum distance from one another.

6. A wireless network as claimed in claim 1, characterized in that the starting instants of the same signaling sequences, applied to the associated terminals (4 to 14) by the base station (1 to 3), always lie at a distance from one another which is dependent on the respective channel property determined between the relevant terminal (4 to 14) and the base station (1 to 3).

7. A wireless network as claimed in claim 1, characterized in that the base station (1 to 3) is arranged to transmit a 1-bit signaling information in order to transmit the signaling sequence to be used and the starting instant thereof to a terminal (4 to 14) via a control channel.

8. A wireless network as claimed in claim 1, characterized in that the base station (1 to 3) is arranged to transmit the signaling sequence to be used and its n starting instants, where n>1 and an integer number, to a terminal (4 to 14) via a control channel in order to transmit n-bit signaling information.

9. A wireless network as claimed in claim 1, characterized in that a base station (1 to 3) is arranged to transmit a plurality of different signaling sequences to be used to a plurality of different groups of terminals (4 to 10).

10. A wireless network as claimed in claim 1, characterized in that a base station (1 to 3) includes a first channel access control block (23) which is arranged to
extract data contained in the channels,
conduct the extracted data to various further circuit elements, and
determine the presence of a signaling request from a terminal (4 to 14), and also includes a second channel access control block (24) which is arranged to insert data from various circuit elements into predetermined channels.

11. A wireless network as claimed in claim 1, characterized in that a terminal (4 to 14) includes a first channel access control block (38) which serves to extract data contained in predetermined channels and to conduct the extracted data to various further circuit elements, and a second channel access control block (39) which is arranged to insert data from various circuit elements into predetermined channels and to transmit at least one signaling sequence in dependence on a timer element.

12. A wireless network as claimed in claim 11, characterized in that a terminal (4 to 14) includes a generator (41) with a write memory for storing signaling sequences, and that the second channel access control block (39) is arranged to select a signaling sequence.

13. A wireless network as claimed in claim 1, characterized in that a terminal (4 to 14) is provided for transmitting a signaling sequence with increased amplitude if after a predefined period of time no acknowledgement has occurred of a previously transmitted signaling sequence by the assigned base station (1 to 3).

14. A wireless network as claimed in claim 13, characterized in that a terminal (4 to 14) increases a signaling sequence having increased amplitude in a step-by-step fashion and transmits same until an acknowledgement by the assigned base station (1 to 3) has occurred within a predefined period of time, or the signaling sequence has maximum amplitude.

15. A wireless network as claimed in claim 13, characterized in that a terminal (4 to 14) transmits a signaling sequence several times and in that a base station (1 to 3) is provided for transmitting an acknowledgement to the terminal (4 to 14) if this base station has received the signaling sequence over various frames in the detection window assigned to the terminal (4 to 14).

16. A base station in a wireless network for the exchange of useful data and control data with a plurality of associated terminals, characterized in that the base station is arranged to transmit information representative of a starting instant of at least one signaling sequence of at least one terminal, and that the base station includes a device for correlating a received signaling sequence and for detecting a pulse arising from the received and correlated signaling sequence.

17. A terminal in a wireless network for the exchange of useful data and control data which includes at least one base station and further terminals , characterized in that after reception of information representative of a starting instant of a signaling sequence from the base station, the terminal is arranged to transmit the signaling sequence at said starting instant.

18. A method of exchanging useful data and control data between at least a base station and a plurality of associated terminals in a wireless network, characterized in that enabling transmitting information representative of a starting instant of a signaling sequence to at least one terminal,
enabling transmitting a signaling sequence at the transmitted starting instant, and
enabling correlating a received signaling sequence in the base station and detecting the pulse arising therefrom.

* * * * *